United States Patent
Ronagh

(10) Patent No.: US 10,275,423 B2
(45) Date of Patent: Apr. 30, 2019

(54) METHOD AND SYSTEM FOR CONTINUOUS OPTIMIZATION USING A BINARY SAMPLING DEVICE

(71) Applicant: 1QB INFORMATION TECHNOLOGIES INC., Vancouver (CA)

(72) Inventor: Pooya Ronagh, Vancouver (CA)

(73) Assignee: 1QB INFORMATION TECHNOLOGIES INC., Vancouver, British Columbia (CA)

( * ) Notice: Subject to any disclaimer, the term of this patent is extended or adjusted under 35 U.S.C. 154(b) by 106 days.

(21) Appl. No.: 14/737,868

(22) Filed: Jun. 12, 2015

(65) Prior Publication Data

US 2015/0363358 A1 Dec. 17, 2015

Related U.S. Application Data

(60) Provisional application No. 62/011,254, filed on Jun. 12, 2014.

(51) Int. Cl.
*G06F 17/11* (2006.01)
*G06N 99/00* (2010.01)
*G06N 7/00* (2006.01)

(52) U.S. Cl.
CPC .......... *G06F 17/11* (2013.01); *G06N 99/002* (2013.01); *G06N 7/005* (2013.01)

(58) Field of Classification Search
CPC ....... G06F 17/11; G06Q 10/04; G06N 99/002
See application file for complete search history.

(56) References Cited

U.S. PATENT DOCUMENTS

| | | | |
|---|---|---|---|
| 9,836,432 B2* | 12/2017 | Ronagh | G06F 17/11 |
| 2014/0187427 A1* | 7/2014 | Macready | G06N 99/002 |
| | | | 505/170 |

(Continued)

OTHER PUBLICATIONS

Alfonso de la Fuente Ruiz, "Quantum Annealing", Computing Research Repository (CoRR), Apr. 2014.*

(Continued)

*Primary Examiner* — Matthew D Sandifer
(74) *Attorney, Agent, or Firm* — Pearl Cohen Zedek Latzer Baratz LLP

(57) ABSTRACT

A method and system are disclosed for continuous optimization. The method comprises obtaining an optimization problem involving continuous or semi-continuous variables in a digital computer; initiating a stochastic search process in the digital computer in order to solve the optimization problem; until a stopping criterion is met constructing in the digital computer at least one stochastically generated polynomial in binary variables representative of choices of candidate future state of the stochastic search process, providing the at least one polynomial in binary variables to a binary sampling device, sampling from domains of the at least one polynomial in binary variables using the binary sampling device to generate binary sample points, receiving the generated binary sample points in the digital computer and transiting to next state of the stochastic search process and providing a best known solution found as a solution of the optimization problem using the digital computer.

9 Claims, 9 Drawing Sheets

(56) References Cited

U.S. PATENT DOCUMENTS

2014/0297247 A1* 10/2014 Troyer ............... G06F 17/5009
                                                    703/21
2014/0344322 A1* 11/2014 Ranjbar ................ G06F 17/11
                                                    708/270

OTHER PUBLICATIONS

Ben-Ameur, W. "Computing the Initial Temperature of Simulated Annealing," Comput. Optim. Appl., 29, 369-385. 2004. Kluwer Academic Publishers.
Dukkipati et al. "Cauchy Annealing Schedule: An Annealing Schedule for Boltzmann Selection Scheme in Evolutionary Algorithms," Proceedings of the Congress on Evolutionary Computation, IEEE Press, pp. 55-62. 2004.
Hajek, Bruce. "Cooling Schedules for Optimal Annealing," Mathematics of Operation Research, vol. 13, No. 2. May 1988. 311-329.
McGeoch et al. (2013), "Experimental Evaluation of an Adiabatic Quantum System for Combinatorial Optimization," Computing Frontiers, May 14-16, 2013.
Siarry et al., 1997, "Enhanced Simulated Annealing for Globally Minimizing Functions of Many-Continuous Variables," ACM Trans. Math. Softw. 23, 2 (Jun. 1997), pp. 209-228.
S. Kirkpatrick et al., "Optimization by Simulated Annealing," Science, vol. 220, No. 4598, (1983), pp. 671-680.

* cited by examiner

METHOD AND SYSTEM FOR CONTINUOUS OPTIMIZATION USING A BINARY SAMPLING DEVICE

CROSS-REFERENCE TO RELATED APPLICATION

The present application claims priority of U.S. Provisional Patent Application No. 62/011,254, filed on Jun. 12, 2014, which is hereby incorporated by reference in its entirety.

FIELD OF THE INVENTION

The invention relates to continuous optimization. More precisely, the invention pertains to a method and system for solving an optimization problem in continuous variables using a binary sampling device.

BACKGROUND OF THE INVENTION

A well-known stochastic search method is simulated annealing. Simulated annealing is a general optimization technique for solving combinatorial optimization problems (e.g., Travelling Salesperson and VLSI design, c.f. S. Kirkpatrick et al., *"Optimization by Simulated Annealing," Science*, Vol. 220 (1983), pp. 671-680), as well as optimization problems involving mixed-integer, continuous and/or semi-continuous variables.

As a continuous optimization method, simulated annealing shows promising results in several cases of non-convex and mixed integer optimization problems.

An extensive overview and survey on simulated annealing can be found in, *"Simulated Annealing: Theory and Applications"* by P. J. M. van Laarhoven and E. H. L. Aarts, D. Reidel Publishing Company.

Various features of a simulated annealing algorithm, for instance the definition of some type of neighborhood structure (e.g., a topology, a metric, or an adjacency graph) on the feasible region, a temperature schedule (a.k.a. cooling schedule), method(s) of generation of points, acceptance criteria (a.k.a. selection scheme in population-oriented simulated annealing), population sizes, etc., are general concepts that need to be selected accordingly for the specific application one is tackling. The performance of the algorithm depends heavily on a wise selection of such features.

Features of the invention will be apparent from review of the disclosure, drawings and description of the invention below.

BRIEF SUMMARY OF THE INVENTION

According to a broad aspect, there is disclosed a method for continuous optimization using a stochastic search process, the method comprising obtaining an optimization problem involving continuous or semi-continuous variables in a digital computer; initiating a stochastic search process in the digital computer in order to solve the optimization problem; until a stopping criterion is met constructing in the digital computer at least one stochastically generated polynomial in binary variables representative of choices of candidate future state of the stochastic search process, providing the at least one polynomial in binary variables to a binary sampling device, sampling from domains of the at least one polynomial in binary variables using the binary sampling device to generate binary sample points, receiving the generated binary sample points in the digital computer and transiting to next state of the stochastic search process; and providing a best known solution found as a solution of the optimization problem using the digital computer.

In accordance with an embodiment, the optimization problem comprises an objective function with equality and inequality constraints.

In accordance with another embodiment, the optimization problem is obtained in the digital computer from at least one of a user, a computer, a software package and an agent.

In accordance with another embodiment, the initiating of a stochastic search process in the digital computer comprises setting up the stochastic search process; setting up usage of the binary sampling device; initializing temperature and initializing a state of the stochastic search process.

In accordance with an embodiment, the providing of a best known solution found as a solution of the optimization problem comprises providing the best known solution found to a user interacting the digital computer.

In accordance with an embodiment, the providing of a best known solution found as a solution of the optimization problem comprises providing the best known solution found to another computer operatively connected to the digital computer.

According to another broad aspect, there is disclosed a digital computer comprising a central processing unit; a display device; a communication port for operatively connecting the digital computer to a binary sampling device; a memory unit comprising an application for continuous optimization using a stochastic search process, the application comprising instructions for obtaining an optimization problem involving continuous or semi-continuous variables; instructions for initiating a stochastic search process in order to solve the optimization problem; instructions for, until a stopping criterion is met, constructing at least one stochastically generated polynomial in binary variables representative of choices of candidate future state of the stochastic search process, providing the at least one stochastically generated polynomial in binary variables to the binary sampling device via the communication port, receiving generated binary sample points obtained by sampling from domains of the at least one stochastically generated polynomial in binary variables using the binary sampling device and transiting to next state of the stochastic search process and instructions for providing a best known solution found as a solution of the optimization problem.

According to another broad aspect, there is disclosed a non-transitory computer-readable storage medium for storing computer-executable instructions which, when executed, cause a digital computer to perform a method for continuous optimization using a stochastic search process, the method comprising obtaining an optimization problem involving continuous or semi-continuous variables; initiating a stochastic search process in order to solve the optimization problem; until a stopping criterion is met, constructing at least one stochastically generated polynomial in binary variables representative of choices of candidate future state of the stochastic search process, providing the at least one stochastically generated polynomial in binary variables to a binary sampling device, receiving generated binary sample points obtained by sampling from domains of the at least one stochastically generated polynomial in binary variables using the binary sampling device and transiting to next state of the stochastic search process; and providing a best known solution found as a solution of the optimization problem.

According to another broad aspect, there is disclosed a method for continuous optimization using a stochastic search process, the method comprising obtaining, in a digital computer, an optimization problem involving continuous or semi-continuous variables; initiating a stochastic search process in the digital computer in order to solve the optimization problem; until a stopping criterion is met constructing in the digital computer at least one stochastically generated polynomial in binary variables representative of choices of candidate future state of the stochastic search process, providing the at least one stochastically generated polynomial in binary variables to a binary sampling device, receiving, in the digital computer, generated binary sample points obtained by sampling from domains of the at least one stochastically generated polynomial in binary variables using the binary sampling device, and transiting to next state of the stochastic search process; providing a best known solution found as a solution of the optimization problem using the digital computer.

It will be appreciated that the method disclosed herein provides a modification of the optimization methods using a stochastic process that takes advantage of a binary sampling device. The method comprises using a microprocessor for receiving an optimization problem that has all its variables real and continuous and running a stochastic search for optimal answers; from a current state, stochastically generating at least one candidate future states, ranking the candidate states according to their optimality using the binary sampling device, entering a next state using this ranking; and repeating this process to thereby solve the optimization problem.

An advantage of the method disclosed herein is that it incorporates sampling using a binary sampling device in transition to a next state. One of the time-consuming steps of a conventional stochastic search method, e.g., simulated annealing, is the evaluation of the objective function on the stochastically generated candidate future states and comparison of the value at that point with the current state.

The method disclosed herein takes advantage of implicitly comparing values of an objective function in an exponential number of states using the binary sampling device. The method disclosed herein therefore shows significant improvement in speed compared to prior-art stochastic search methods in large optimization problems.

The method disclosed herein provides the user with the ability to set the above features in order to turn the stochastic search process to a simulated annealing method. Specifically, and as explained further below, the user will have the ability to override a list of keywords in order to implement various features of the stochastic search method, as desired.

Method overriding is a concept in object-oriented programming and is allowed in many programming languages, such as Python, Java, and C++. In fact, method overriding is a language feature that allows a subclass or child class to provide a specific implementation of a method that is already provided by one of its superclasses or parent classes.

BRIEF DESCRIPTION OF THE DRAWINGS

In order that the invention may be readily understood, embodiments of the invention are illustrated by way of example in the accompanying drawings.

Figure 1:
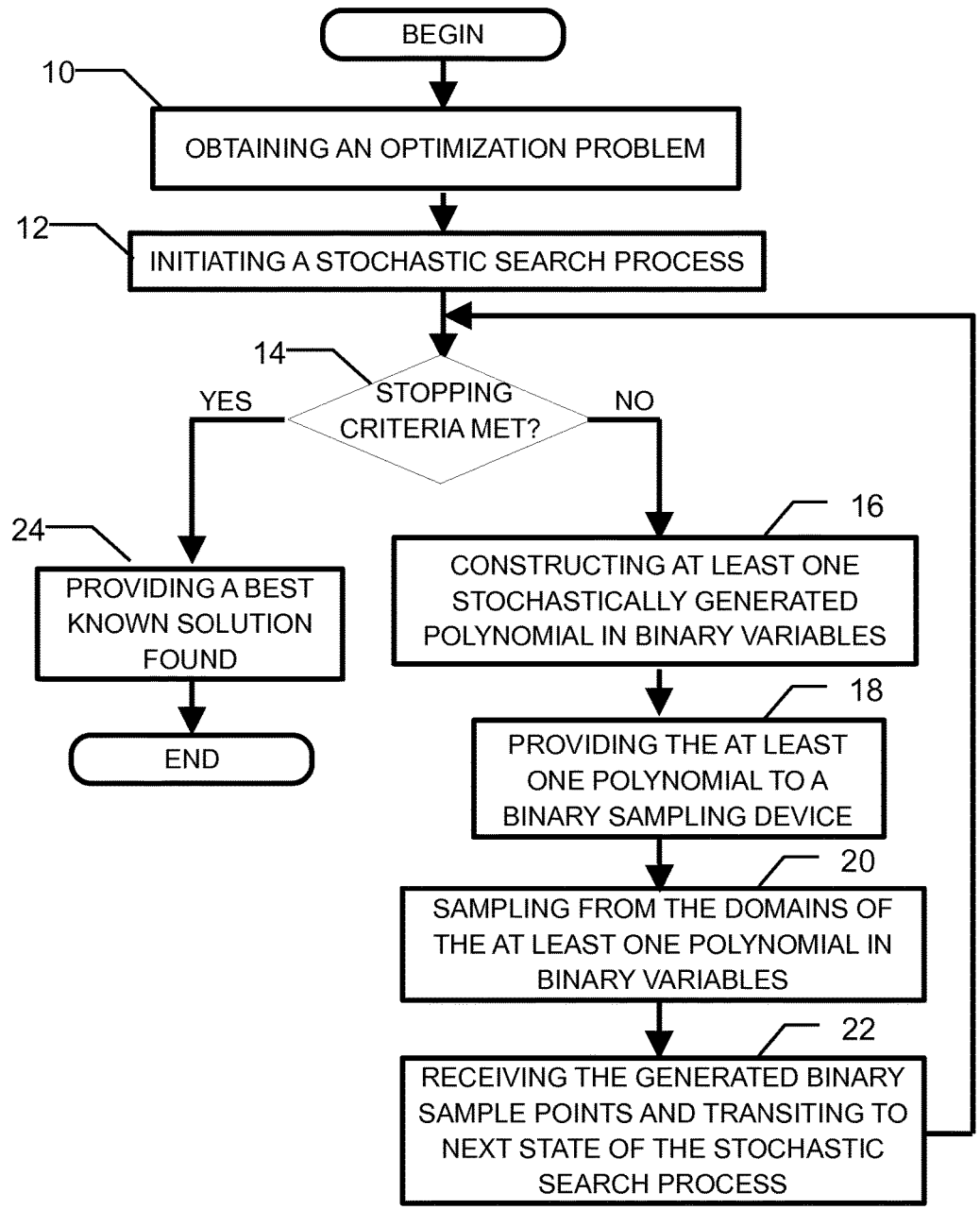
FIG. 1 is a flowchart that shows an embodiment of a method for solving a continuous optimization problem using a binary sampling device.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

TERMS

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an," "at least one" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restrict the meaning or scope of the claim.

The term "e.g." and like terms mean "for example," and thus does not limit the term or phrase it explains. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the term or phrase they explain. For example, in the sentence "the computer sends data (i.e., instructions) over the Internet," the term "i.e." explains that "instructions" are the "data" that the computer sends over the Internet.

The term "optimization problem" and like terms mean finding a minimum of an "objective function" $y=f(x)$ in variable $x \in D$, where D is a real domain, e.g., a metric space, a real vector space, etc., or a subspace of such, under the constraint of $x \in F$; here $F \subseteq D$ is called the "feasible" region.

The feasible region can for instance be determined by a, possibly empty, family of equality constraints, $g_i(x)=0$ for $i=1, \ldots, s$ and a, possibly empty, family of inequality constraints, $h_j(x) \leq 0$ for $j=1, \ldots, r$.

The term "binary sampling device" and like terms mean any system consisting of one or many types of hardware that implements sampling from the domains of real polynomials in binary variables according to the values of their objective functions. The variables can for instance be zero/one or plus/minus one, and the degree of the real polynomials can be two or higher. An example of a binary sampling device is a machine that simulates/implements quantum annealing that can be seen in: Catherine C. McGeoch and Cong Wang, 2013, *Experimental evaluation of an adiabatic quantum system for combinatorial optimization, in Proceedings of the ACM International Conference on Computing Frontiers* (CF '13). ACM, New York, N.Y., U.S.A., Article 23, 11 pages. DOI: 10.1145/2482767.2482797.

It will be appreciated that the "binary sampling device" may be comprised of "classical components," such as a classical computer, in one embodiment. Accordingly, the "binary sampling device" may entirely be analog or an analog-classical hybrid.

Neither the Title nor the Abstract is to be taken as limiting in any way the scope of the disclosed invention(s). The title of the present application is for convenience only, and is not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention can be implemented in numerous ways, including as a method, a system, a non-transitory computer-readable storage medium such as a computer readable storage medium. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task.

With all this in mind, the present invention is directed to a method and a system for solving continuous optimization using a stochastic search process.

Figure 2:
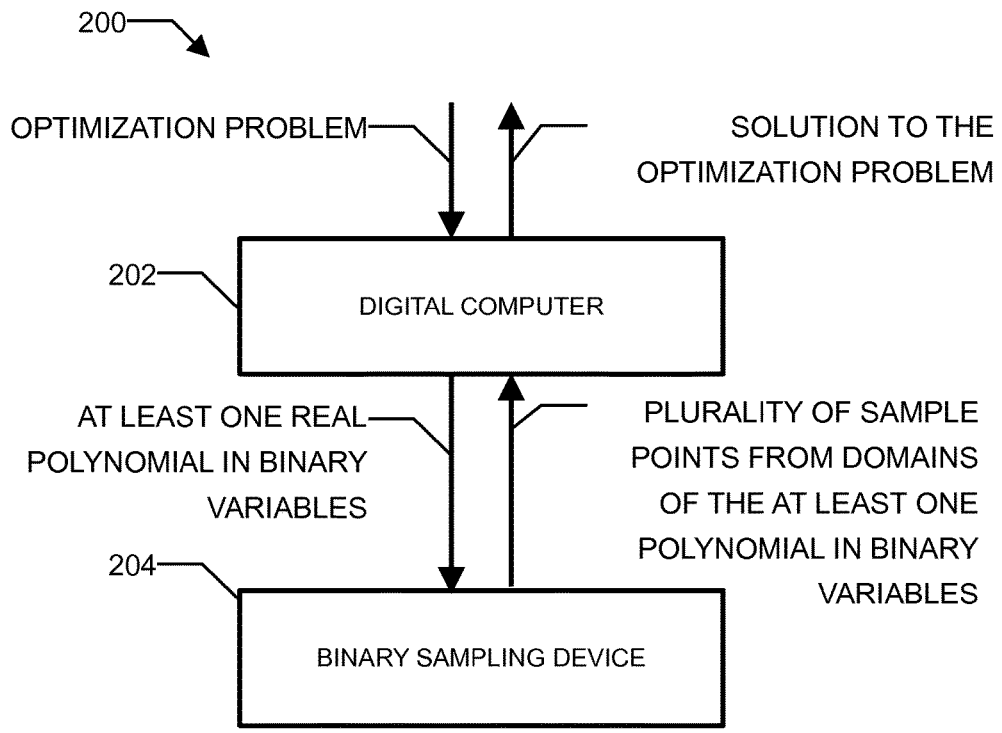
FIG. 2 is a diagram that shows an embodiment of a system in which the method for solving a continuous optimization problem using a binary sampling device may be implemented. The system comprises a digital computer and a binary sampling device.

Now referring to FIG. 2, there is shown an embodiment of a system 200 in which an embodiment of the method for solving an optimization problem using a binary sampling device may be implemented.

In this embodiment, the system 200 comprises a digital computer 202 and a binary sampling device 204.

The digital computer 202 receives an optimization problem and provides a solution to the optimization problem.

It will be appreciated that the optimization problem may be provided according to various embodiments.

In one embodiment, the optimization problem may be provided by a programmer scripts in one of the supported languages (e.g., Python/C++/Matlab) interacting with the digital computer 202 and overriding a selection of reserved keywords in the system 200.

In an alternative embodiment, the optimization problem may be provided by another computer operatively connected to the digital computer 202, not shown.

In a further alternative embodiment, the optimization problem may be provided by an independent software package.

In an alternative embodiment, the optimization problem may be provided by an intelligent agent.

Similarly, it will be appreciated that the solution to the optimization problem may be provided according to various embodiments.

In accordance with an embodiment, the solution to the optimization problem may be provided to the user interacting with the digital computer 202.

In an alternative embodiment, the solution to the optimization problem may be provided to another computer operatively connected to the digital computer 202.

It will be appreciated by the skilled addressee that the digital computer 202 may be any type of computer.

In one embodiment, the digital computer 202 is selected from a group consisting of desktop computers, laptop computers, tablet PC's, servers, smartphones, etc.

Figure 3:
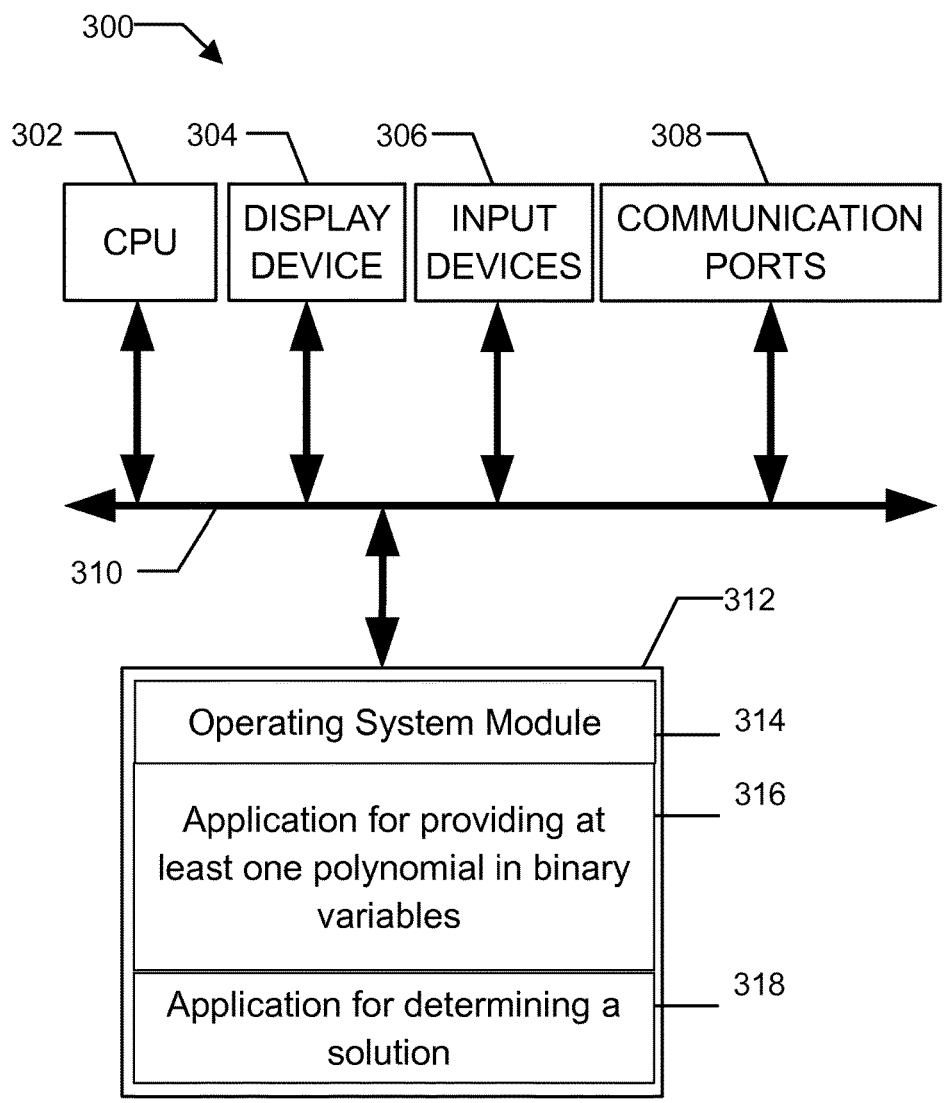
FIG. 3 is a diagram that shows an embodiment of a digital computer used in the system for solving a continuous optimization problem using a binary sampling device.

Now referring to FIG. 3, there is shown an embodiment of the digital computer 202.

In this embodiment, the digital computer 202 comprises a central processing unit (CPU) 302, also referred to as a microprocessor, a display device 304, input devices 306, communication ports 308, a data bus 310 and a memory unit 312.

The central processing unit (CPU) 302 is used for processing computer instructions. The skilled addressee will appreciate that various embodiments of the central processing unit (CPU) may be provided.

In one embodiment, the central processing unit (CPU) 302 comprises a CPU Core i7-3820 running at 3.6 GHz and manufactured by Intel™.

The display device 304 is used for displaying data to a user. The skilled addressee will appreciate that various types of display device may be used.

In one embodiment, the display device 304 comprises a standard liquid-crystal display (LCD) monitor.

The communication ports 308 are used for sharing data with the digital computer 202.

The communication ports 308 may comprise, for instance, a universal serial bus (USB) port for connecting a keyboard and a mouse to the digital computer 202.

The communication ports 308 may further comprise a data network communication port such as an IEEE 802.3 (Ethernet) port for enabling a connection of the digital computer 202 with another computer via a data network, not shown.

The skilled addressee will appreciate that various alternative embodiments of the communication ports 308 may be provided.

In one embodiment, the communication ports 308 comprise an Ethernet port and a mouse port (e.g., Logitech™).

The memory unit 312 is used for storing computer executable instructions.

It will be appreciated that the memory unit 312 comprises, in one embodiment, an operating system module 314.

It will be appreciated by the skilled addressee that the operating system module 314 may be of various types.

In one embodiment, the operating system module 314 comprises Windows™ 8 manufactured by Microsoft™.

The memory unit 312 further comprises an application for providing polynomials in binary variables 316.

The memory unit 312 further comprises an application for determining a solution 318.

In an alternative embodiment, the memory unit 312 comprises an application for continuous optimization using a stochastic search process.

The application for continuous optimization using a stochastic search process comprises instructions for obtaining an optimization problem involving continuous or semi-continuous variables.

The application for continuous optimization using a stochastic search process further comprises instructions for initiating a stochastic search process in order to solve the optimization problem.

The application for continuous optimization using a stochastic search process further comprises instructions for, until a stopping criterion is met, constructing at least one stochastically generated polynomial in binary variables representative of choices of candidate future state of the stochastic search process, providing the at least one stochastically generated polynomial in binary variables to the binary sampling device via the communication port, receiving generated binary sample points obtained by sampling from domains of the at least one stochastically generated polynomial in binary variables using the binary sampling device and transiting to next state of the stochastic search process.

The application for continuous optimization using a stochastic search process further comprises instructions for providing a best known solution found as a solution of the optimization problem.

Each of the CPU 302, the display device 304, the input devices 306, the communication ports 308 and the memory unit 312 is interconnected via the data bus 310.

Now referring back to FIG. 2, it will be appreciated that the binary sampling device 204 is operatively connected to the digital computer 202.

It will be appreciated that the coupling of the binary sampling device 204 to the digital computer 202 may be achieved according to various embodiments.

In one embodiment, the coupling of the binary sampling device 204 to the digital computer 202 is achieved via a data network, not shown.

The binary sampling device 204 may be of various types.

In one embodiment, the binary sampling device 204 is manufactured by D-Wave Systems Inc. The skilled addressee will appreciate that various alternative embodiments may be provided for the binary sampling device.

More precisely, the binary sampling device 204 receives at least one real polynomial in binary variables from the digital computer 202.

A binary sampling device is capable of sampling from the domains of the at least one real polynomials in binary variables and providing at least one corresponding one or several sample binary points, each of the at least one corresponding one or several sample binary points for real polynomial in binary variables of the at least one real polynomial in binary variables.

The at least one sample points is provided by the binary sampling device 204 to the digital computer 202.

The term "stochastic search process" refers to a stochastic process, states of which are points or tuples of points in the domain D. Often, this random process is a Markov chain. Such a stochastic process explores points of the domain with the goal of finding an optimal point for an optimization problem.

The term "stochastic procedure/algorithm/method/process" refers to an algorithm that simulates the above stochastic process in search for fittest points of the domain D.

There may be one or several evaluations that would determine the fitness of points of the domain D according to an evaluation of them. For instance, they may need to satisfy some feasibility constraints or receive lower/lowest or higher/highest values for a function, a.k.a. objective function, defined on this domain D.

It will be appreciated that a stochastic search process makes transitions from a current state, point or tuples of points on the domain D, to a next state (a next point, or next tuple of points on the domain D). Each such transition occurs depending on several parameters.

In fact, a first parameter is called temperature. Temperature is a real number. The term "temperature schedule" or "cooling schedule" refers to a rule of creating later temperature given current and previous ones, therefore creating a "temperature sequence."

A second parameter is called the transition function. This transition function generates at least one state that will be considered as candidate next states of the stochastic search process.

Now referring to FIG. 1 and according to processing step 10, an optimization problem is obtained. It will be appreciated that the obtaining of the optimization problem may be achieved using a script written in a supported language in one embodiment.

It will be appreciated that the optimization problem may consist of an objective function, together with equality and inequality constraints.

In one embodiment, the optimization problem has an objective function $y = f(x)$ where $x \in \mathbb{R}^n$ is a vector of n variables. The equality constraints are $g_i(x)=0$ for $i=1, \ldots, r$ and the inequality constraints are $h_j(x) \leq 0$ for $j=1, \ldots, s$.

Figure 4:
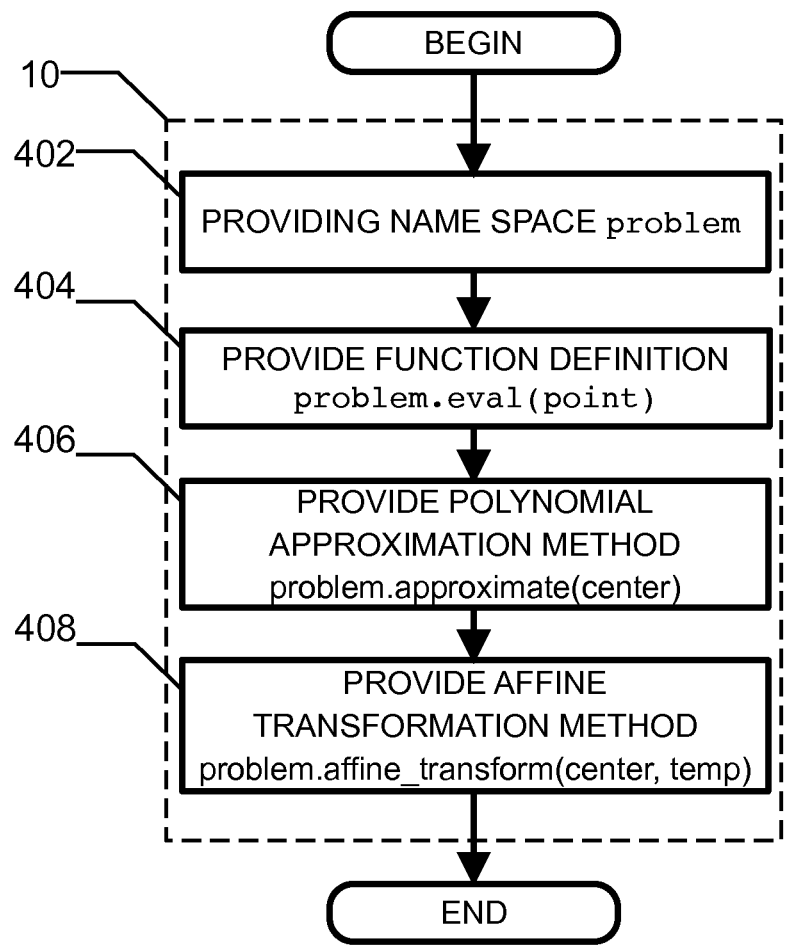
FIG. 4 is a flowchart that shows an embodiment for obtaining a continuous optimization problem.

Now referring to FIG. 4, there is shown an embodiment for obtaining the optimization problem.

More precisely and according to processing step 402, a script file is provided. In one embodiment, the script file is provided to a user/programmer. The programmer may override the following objects provided by namespace problem.

According to processing step 404, function problem. eval( ) is provided. It will be appreciated that this function receives an array of numbers of type double, and returns a number of type double representative of the value of the objective function of the optimization problem at an input point in domain D.

According to processing step 406, a method for approximating the objective function with a polynomial is provided. In one embodiment, the module problem.approximate( ) receives an array of double numbers named center here, representative of a point in domain D and returns an instance of type poly, representative of a real polynomial in real variables centered at the point center.

Let $f$ be the objective function $y=f(x)$ defined on the domain D and $c \in D$ be a given point. The goal is to approximate $f$ with a polynomial in some neighborhood of c, denoted as $P_{f,c}(x)$.

As an example, $P_{f,c}(x)$ can be defined as a Taylor approximation of $f(x)$, centered at c of a desired degree.

Other options may be to use approximations using Legendre polynomials, Chebyshev polynomials, interpolation and least square method.

Still referring to FIG. 4 and according to processing step 408, a method for creating an affine transformation from the space of vectors in entries 1 and −1 to the feasible region of the optimization problem is provided. In one embodiment, the module problem.affine_transformation( ) is used which receives an array of double numbers named center here, representative of a point in domain D and a double number named temp here, representative of the current temperature, and returns a pair (A,b) of an n×d array (or matrix) A and an n×1 array (or matrix) b, where n is the number of variables of the objective function and d is the number of variables of the binary polynomial to be provided to the binary sampling device. The pair (A, b) is therefore representative of the affine transformation $x \mapsto Ax+b$ from $\mathbb{R}^d$ to $\mathbb{R}^n$.

It will be appreciated that often the module problem.affine_transformation( ) may create an affine transformation that depends on temperature and this generation is produced according to random variables. A user may hence call spec.sample_from_distribution( ) in order to make an affine transformation using a probability distribution function that depends on the temperature.

For example, the optimization problem may have an objective function defined on $\mathbb{R}^n$. The feasible region may be encoded as a pair $(A_{eq}, b_{eq})$ of a set of system of linear equality constraints, $A_{eq} x = b_{eq}$ where $A_{eq}$ is an m×n matrix and $b_{eq}$ in an m×1 matrix. Similarly, the feasible region may need to satisfy linear inequality constraints, $A_{ineq} x \leq b_{ineq}$. In this case, another pair of matrices $(A_{ineq}, b_{ineq})$, will store this information. These types can optionally be saved in reserved keywords problem.eq_const and problem.ineq_const.

For example, if the equality and inequality constraints of the optimization problem are all linear, then the feasible region is a polytope and the following procedure may be used as a method of generating affine transformations.

Given the generating distribution spec.distribution (temp), $v_1, \ldots, v_d$ are picked in neighborhood of the current point $x \in D$ according to this distribution. The vectors $w_i = v_i - x$, form a family $\{w_1, \ldots, w_d\}$ of vectors that we require to be linearly independent. These vectors produce an n×d matrix A.

It will be appreciated that each vector $w_i$ may need to be dilated by multiplication by a scalar. The goal is that after such scalar multiplications all binary vectors $\delta \in \{-1, 1\}^{\times d}$ satisfy $A\delta + x \in D$.

In other words, the pair (A, x) is now representative of a suitable affine transformation $\delta \mapsto A\delta + x$ such that the image of every binary vector $\delta \in \{-1, 1\}^{\times d}$ is in the region D. It may also be required that the image of every such binary vector is feasible as well, i.e., being inside $F \subseteq D$.

It will be appreciated by the skilled addressee that the construction of the above linear transformation may be performed in computational time of order O(nd) provided that the region concerned (e.g., D or F in the above example) is a bounded polytope.

Referring back to FIG. 1 and according to processing step 12, a stochastic search process is initiated.

Figure 5:
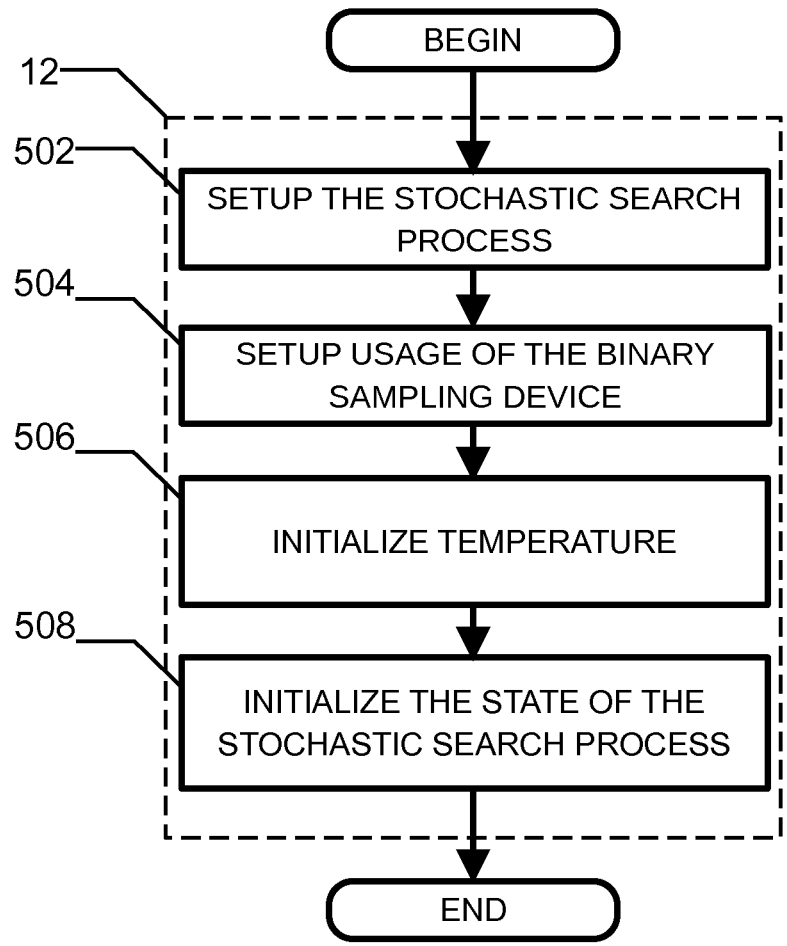
FIG. 5 is a flowchart that shows an embodiment for initiating a stochastic search process.

Now referring to FIG. 5, there is shown an embodiment for initiating the stochastic search process.

According to processing step 502, the stochastic search process is setup.

Figure 6:
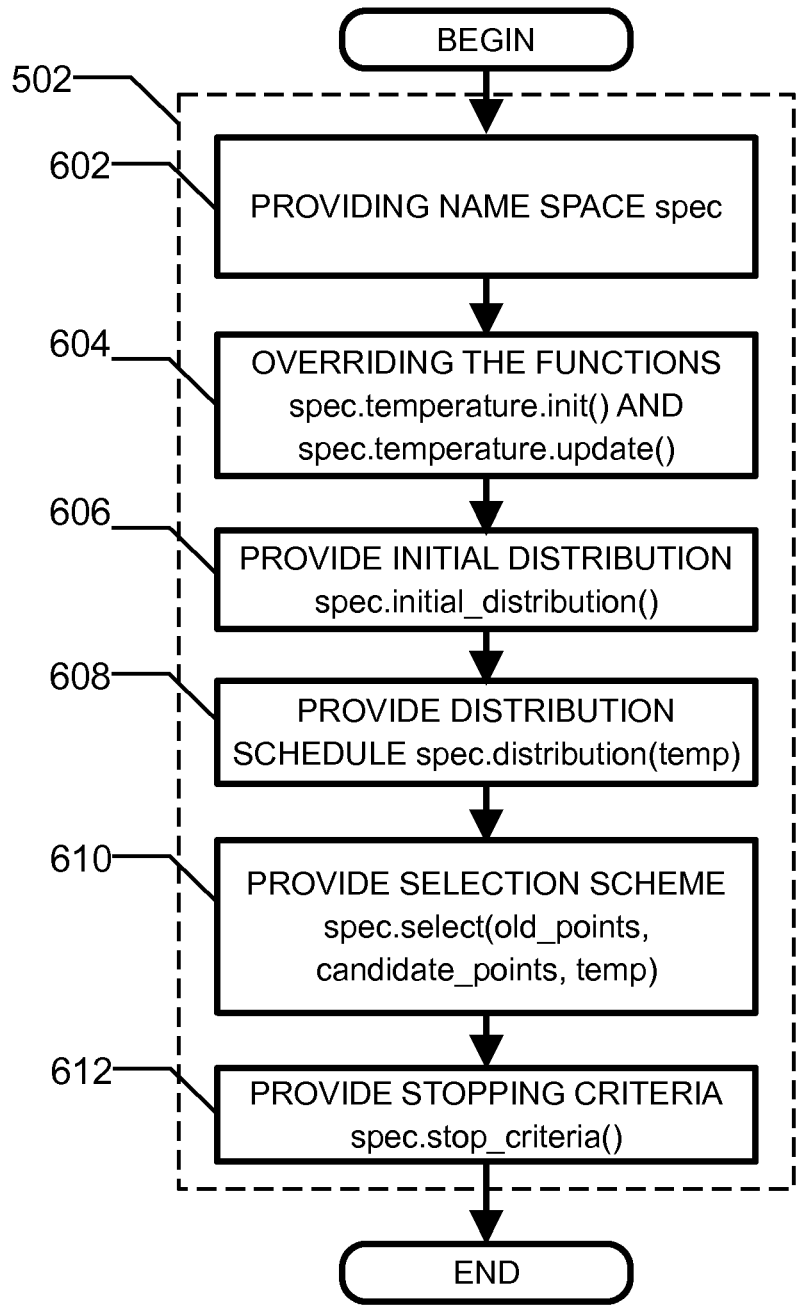
FIG. 6 is a flowchart that shows an embodiment for setting specifications of a stochastic search process.

Now referring to FIG. 6, there is shown an embodiment for setting up the stochastic search process 502.

According to processing step 602, a script file is provided. In one embodiment, the script file is provided to the user/programmer. It will be appreciated that the user/programmer may override the following objects provided by namespace spec.

According to processing step 604, a temperature schedule is provided. In one embodiment, the temperature schedule is provided using modules, spec.temperature.init( ) and spec.temperature.update( ).

It will be appreciated that the providing of these modules may be carried by the user/programmer in one embodiment. It will be further appreciated that the module spec.temperature.init( ) returns a float-type object representative of the initial temperature of the stochastic search process.

As an example, the initial temperature can be set according to the suggestion of Ben-Ameur, W., & Ben-Ameur, W. (2004). "*Computing the Initial Temperature of Simulated Annealing,*" Comput. Optim. Appl., 29, 369-385. Kluwer Academic Publishers (doi 10.1023/B:COAP.0000044187.23143.bd)

The module spec.temperature.update( ) updates the temperature and returns an object of type double representative of the new temperature. In one embodiment, the user writing the script of this module has access to the type spec.temperature.history that is an array of the series of all temperatures assigned previously.

In one example, this temperature schedule can be the suggestion of Bruce Hajek, 1988, *Cooling schedules for optimal annealing, Mathematics of Operation Research*, Vol. 13, No. 2 (May 1988), 311-329 (doi: 10.1287/moor.13.2.311)

Still referring to FIG. 6 and according to processing step 606, a method for initializing the stochastic search process is provided. In one embodiment, this is achieved by overriding the module spec.initial_distribution( ). This module returns an array of points of the domain D.

Often, the initial distribution of the stochastic search process is desirable to be uniform on the feasible region. It will be appreciated that there are many proposed methods for generating random points in a given subset $D \subseteq \mathbb{R}^n$, representative of the domain of definition of the objective function or alternatively in $F \subseteq \mathbb{R}^n$ representative of the feasible region of the optimization problem. The goal is for the distribution of such random points to be as close to the uniform distribution on D, alternatively F, as possible.

For example, if D, or alternatively F, is a polytope, a 'hit and run' Markov chain that starts from the Chebychev center of the polytope and makes a random walk on the polytope may be used to generate a random point in a polytope in an approximately uniform way (c.f. Kroese, D. P. and Taimre, T. and Botev, Z. I., *Handbook of Monte Carlo Methods* (2011), pp. 240-244).

According to processing step 608, a distribution schedule spec. distribution(temp) is provided which given temperature temp, returns a sample point, or an array of points, from a distribution centered at origin of a Euclidean space. In one embodiment, the distribution schedule is provided by a user. The distribution may be different for different temperatures. This module can be used by problem.affine_transformation (center, temp).

Still referring to FIG. 6 and according to processing step 610, a selection scheme is provided. In one embodiment, the selection scheme is provided by a user. Still in one embodiment, the selection scheme is provided using spec.select (old_points, candidate_points, temp). It will be appreciated that this process takes an array old_points, representative of the current state of the stochastic process and an array, candidate_points, representative of candidate new points for the next state of the stochastic search process and returns an array of selected points, representative of the next state of the stochastic search process.

This process often depends on the temperature temp and the characteristics of the binary sampling, e.g., the distribution it samples from, the noisiness of the distribution, etc.

For instance, if a simulated annealing process takes values in the domain D, then the array of old points consists only of one point, the current state of the simulated annealing process, and the selection scheme returns only a single point in the domain D. In conventional simulated annealing, such a selection scheme is the Boltzmann acceptance criteria.

If the stochastic search process is a population-based method, then the process of accepting a next proposed state from the current one is replaced by a selection scheme.

For example, any of the famous selection schemes such as Boltzmann tournament scheme, Boltzmann scheme, and Cauchy scheme, A. Dukkipati, M. N. Murty, and S. Bhatnagar (2004), "*Cauchy Annealing Schedule: An Annealing Schedule for Boltzmann Selection Scheme in Evolutionary Algorithms*" in *Proceedings of the Congress on Evolutionary Computation*, IEEE Press, pp. 55-62, may be implemented.

It will be also appreciated that the length of the array of returned points from selection scheme may also depend on the temperature.

Still referring to FIG. 6 and according to processing step 612, a stopping criterion is provided that, if met, terminates the stochastic search procedure. It will be appreciated that stopping criteria often depend on temperature, accessible as name spec.temperature.value, or the history of previous temperatures spec.temperature.history, accessible from namespace spec. It also often depends on the best solution found so far, problem.current_best, or the history of best solutions, problem.old_bests available as an array through a namespace problem.

Now referring back to FIG. 5, and according to processing step 504, the usage of the binary sampling device is set up. More precisely, it will be appreciated that modules necessary for usage of the binary sampling device are provided in this processing step.

Figure 7:
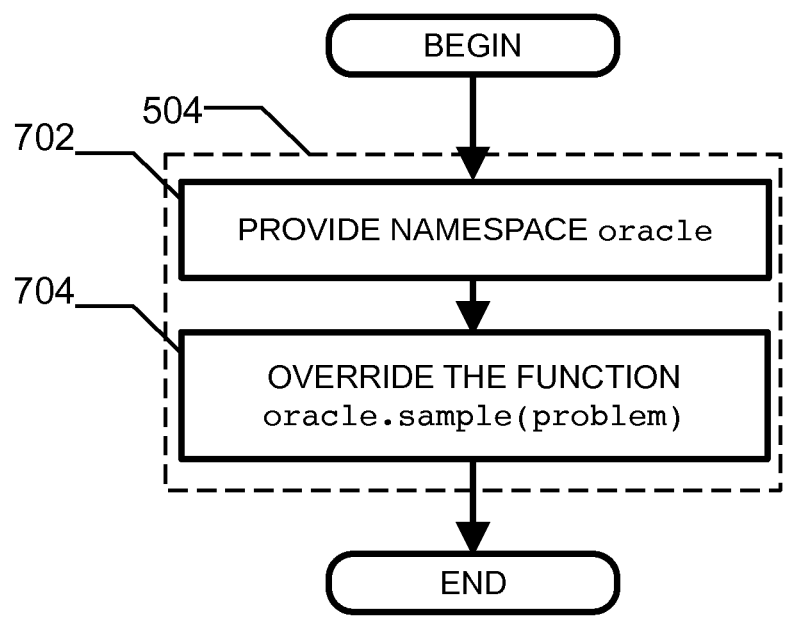
FIG. 7 is a flowchart that shows an embodiment for setting specifications of a binary sampling device to be used for solving a continuous optimization problem.

Now referring to FIG. 7, there is shown an embodiment of a method for providing optimization procedures that use the binary sampling device.

According to processing step 702, a script file is provided. In one embodiment, the script file is provided to the user/programmer. It will be appreciated that the programmer may override the following objects provided by namespace oracle.

According to processing step 704, the module used for sampling from polynomials using the binary sampling device is defined.

It will be appreciated that this module receives one or a plurality of binary polynomials and samples from their domains according to the values the polynomials take on them. It will be appreciated that the reason for providing a plurality of such problems is so that the binary sampling can benefit from any multi-processed, multi-threaded, or simultaneous binary sampling capabilities.

More specifically, the argument of oracle.sample is an array of objects of type poly, representative of polynomials with real coefficients in variables $\{-1, 1\}$.

The script provided by the user overriding this module will make use of various types of binary sampling devices possible.

For example, if the binary sampling device works with Boolean variables $\{0, 1\}$, then a change of variables will need to be implemented in this step.

Any binary optimization problem with variables $\{0, 1\}$ or $\{-1, 1\}$ can be reduced to an optimization problem in degree at most 2. Therefore, if the binary optimization has a restriction on the degree of the polynomials it can optimize, a reduction procedure has to be implemented in this step as well.

For convenience, reserved keywords oracle.maximum_degree and oracle.variable_type are provided in the namespace oracle. Users may save degree restrictions and variable types of the binary sampling device available to them by overriding these names.

Now referring back to FIG. 5 and according to processing step 506, the temperature is initialized. It will be appreciated that the temperature is initialized according to the temperature schedule. In one embodiment, this is performed using a loop iterating on the temperature schedule.

Still referring to FIG. 5 and according to processing step 508, the state of the stochastic search process is initialized. In one embodiment, the state of the stochastic search process is initialized according to user-defined initial state.

Now referring back to FIG. 1 and according to processing step of 14, a test is performed in order to find out if a stopping criterion is met. The stopping criterion can be of many types and may be overridden by the user as explained before. The skilled addressee is referred to Patrick Siarry, Gérard Berthiau, François Durdin, and Jacques Haussy, 1997, *Enhanced simulated annealing for globally minimizing functions of many-continuous variables*. ACM Trans. Math. Softw. 23, 2 (June 1997), 209-228. D01.10.1145/264029.264043 for several suggested stopping criteria.

In the case where the stopping criterion is not met and according to processing step 16, at least one stochastically generated polynomial is constructed. It will be appreciated that this process depends on a current temperature, a current state of the stochastic search process, and specifications of the stochastic search process, as explained below.

Figure 8:
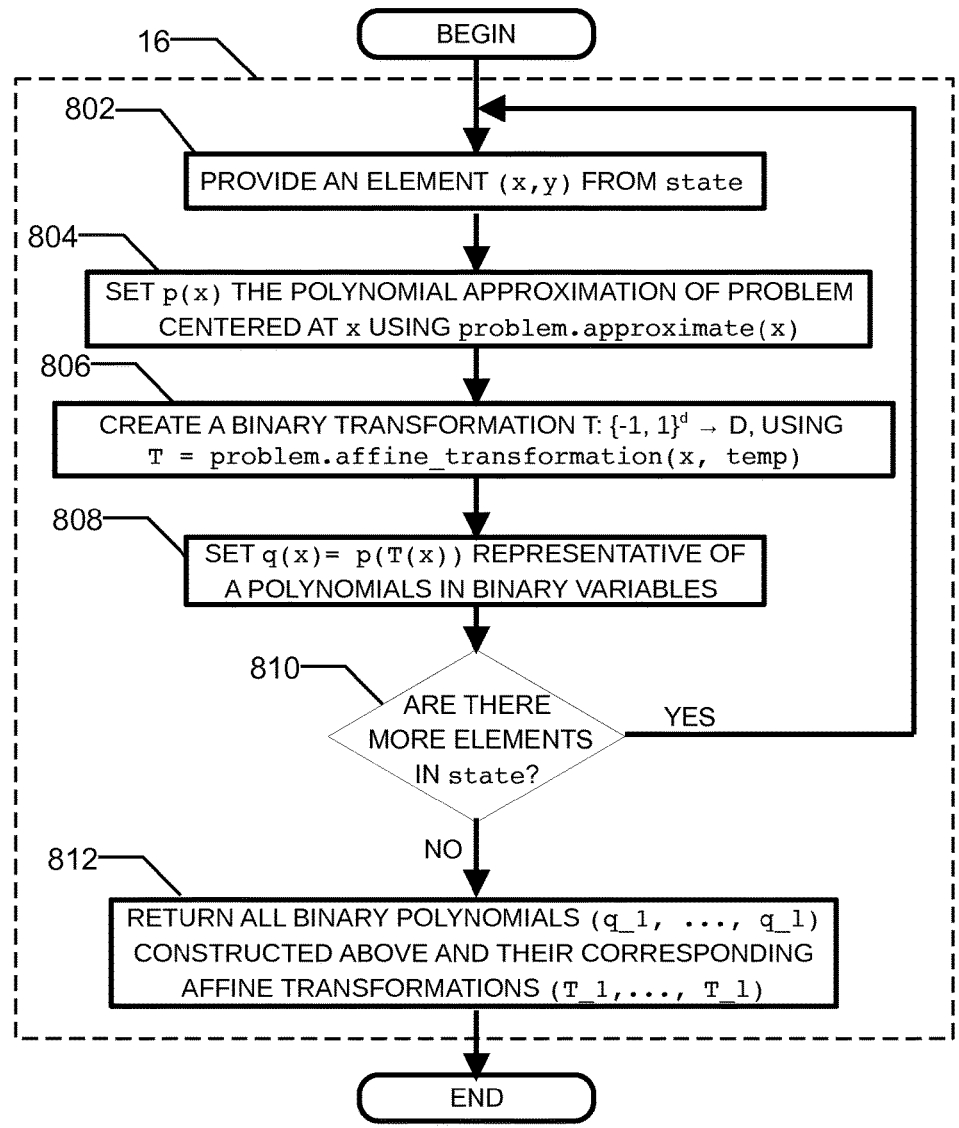
FIG. 8 is a flowchart that shows an embodiment for generating polynomials in binary variables to be used in one iteration of a stochastic search process.

Now referring to FIG. 8, there is shown an embodiment for constructing the at least one stochastically generated polynomial. It will be appreciated that this processing step happens when the stochastic search process is set to some current state, state, which is a point, or an array of points, in the feasible region of the optimization problem, or in the domain of definition of the objective function.

According to processing step 802, an element (x, y) is provided from state.

According to processing step 804, a function problem.approximate(x), is called to produce a polynomial approximation of problem centered at center x.

According to processing step 806, an affine transformation T is created. The affine transformation T created is centered at x and at temperature temp. In one embodiment, the function problem.affine_transformation(x, temp) is called to produce the affine transformation T centered at x at temperature temp.

According to processing step 808, an object q, of type poly representative of the polynomial defined as the composition q=poT is created. Here, p is the approximation of the original objective function $f$ of the original optimization problem. It will be appreciated that this polynomial is the binary polynomial to be sampled from in later steps using the binary sampling device.

According to processing step 810, a test is performed to find out if there are more elements stored in the state of the stochastic search process. In the case where there are more elements in the state of the stochastic search process and according to processing step 802, an element remaining is provided.

Assuming that the array state consists of k elements, state[1], state[2], . . . , state[k] and according to processing step 812, all objects, q[1], . . . , q[k] representative of polynomials $q_1(x)$, . . . , $q_k(x)$ in binary variables, constructed as above, and objects T[1], T[k] representative of their corresponding affine transformations $T_1$, . . . , $T_k$ are passed to the next processing step.

Now referring back to FIG. 1, and according to processing step 18, the at least one binary polynomial is provided to a binary sampling device. It will be appreciated that the at least one binary polynomial may be provided to the binary sampling device according to various embodiments.

Still referring to FIG. 1 and according to processing step 20, the at least one binary polynomial is processed using the binary sampling device.

It will be appreciated that in one embodiment the objects q[i] representative of binary polynomials are arranged in an array *poly, and the function oracle.sample(*poly) is called. The result of this processing step is an array A representative of sets of a tuple of sets of binary points $A_1$, . . . , $A_k$ in the domain of each polynomial.

Still referring to FIG. 1 and according to processing step 22, the generated binary sample points are received by the digital computer and the state of the stochastic search process is now updated using the selection scheme provided by the user.

Figure 9:
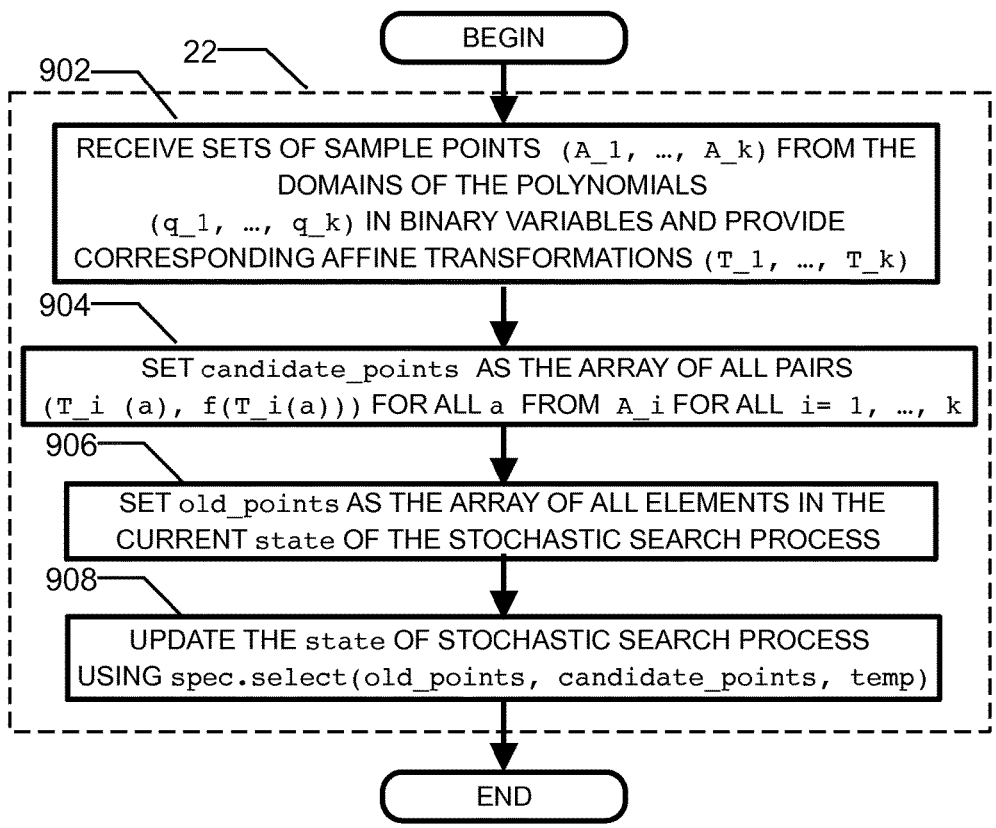
FIG. 9 is a flowchart that shows an embodiment for determining the transition of a stochastic search process from one state to the next one according to a selection scheme.

Now referring to FIG. 9, there is shown an embodiment for receiving the generated sample points and updating the state of the stochastic search process.

More precisely and according to processing step 902, an array of sets of sample points from the domains of the binary polynomials $q_1$, . . . , $q_k$ is provided as an array A=[A[1], . . . , A[k]] representative of the tuple of sets of sample binary points A=($A_1$, . . . , $A_k$), and the corresponding affine transformations are provided as the tuple ($T_1$, . . . , $T_k$).

According to processing step 904, for each array A[i] representative of a set of sample binary points, $A_i$, in the domain of binary polynomial $q_i(x)$ and for each such solution a∈$A_i$ for all i=1, . . . , k, the image of the affine transformations x=$T_i$(a) is calculated and stored in an array, or matrix, x. The value of the objective function at this point, namely $f(T_i(a))$, is computed by calling problem.eval(x) in one embodiment. Still in one embodiment, the tuples (x, problem.eval(x)) are stored in the array candidate_points.

According to processing step 906, old_points is set as the array of all elements in the current state of the stochastic search process.

According to processing step 908, a new state of the stochastic search process is assigned using the selection scheme provided by the function spec.select(old_points, candidate_points, temp).

Now referring to FIG. 1, and according to processing step 14, a test is performed using the stopping criterion provided by spec.stop_criteria( ).

In the case where the stopping criterion is satisfied and according to processing step 24, the stochastic search procedure terminates and the best solution found is provided.

Otherwise, the temperature spec.temperature is updated using spec.temperature.update( ) and the process returns to processing step 16.

It will be appreciated that the continuous optimization method disclosed herein is a general stochastic search method that in special settings can take the form of specific stochastic search methods such as stochastic hill climbing, stochastic steepest descent, simulated annealing or any other Monte Carlo method-based search.

For an introduction and overview of such stochastic search methods, refer to James C. Spall, 2003, *Introduction to Stochastic Search and Optimization* (1 ed.). John Wiley & Sons, Inc., New York, N.Y., U.S.A.

An advantage of the method disclosed herein is that it incorporates sampling using a binary sampling device in transition to a next state. One of the time-consuming steps of a conventional stochastic search method, e.g., simulated annealing, is the evaluation of the objective function on the stochastically generated candidate future steps and comparison of the value at that point with the current state.

The method disclosed herein takes advantage of implicitly comparing values of an objective function in an exponential number of states using the binary sampling device. The method disclosed herein therefore shows significant improvement in speed compared to prior art stochastic search methods in large optimization problems.

It will be appreciated that a non-transitory computer-readable storage medium is also disclosed. The non-transitory computer-readable storage medium is used for storing computer-executable instructions which, when executed, cause a digital computer to perform a method for continuous optimization using a stochastic search process, the method comprising obtaining an optimization problem involving continuous or semi-continuous variables; initiating a stochastic search process in order to solve the optimization problem; until a stopping criterion is met, constructing at least one stochastically generated polynomial in binary variables representative of choices of candidate future state of the stochastic search process, providing the at least one stochastically generated polynomial in binary variables to a binary sampling device, receiving generated binary sample points obtained by sampling from domains of the at least one stochastically generated polynomial in binary variables using the binary sampling device and transiting to next state of the stochastic search process; and providing a best known solution found as a solution of the optimization problem.

It will also be appreciated that there is further disclosed a method for continuous optimization using a stochastic search process, the method comprising obtaining, in a digital computer, an optimization problem involving continuous or semi-continuous variables; initiating a stochastic search process in the digital computer in order to solve the optimization problem; until a stopping criterion is met constructing in the digital computer at least one stochastically generated polynomial in binary variables representative of choices of candidate future state of the stochastic search process, providing the at least one stochastically generated polynomial in binary variables to a binary sampling device, receiving, in the digital computer, generated binary sample points obtained by sampling from domains of the at least one stochastically generated polynomial in binary variables using the binary sampling device, and transiting to next state of the stochastic search process; providing a best known solution found as a solution of the optimization problem using the digital computer.

Although the above description relates to a specific preferred embodiment as presently contemplated by the inventor, it will be understood that the invention in its broad aspect includes functional equivalents of the elements described herein.

The invention claimed is:

1. A method for continuous optimization using a stochastic search process, the method comprising:
obtaining an optimization problem involving a plurality of discrete variables and at least one continuous or semi-continuous variables in a digital computer;
initiating a stochastic search process respecting a neighborhood structure of the plurality of discrete variables in the digital computer in order to solve the optimization problem;
until a stopping criterion is met:
constructing in the digital computer at least one stochastically generated polynomial in binary variables representative of choices of candidate future state of the stochastic search process using an affine transformation of domains of the at least one polynomial,
providing the at least one polynomial in binary variables to a binary sampling device, wherein the binary sampling device is configured to simulate or implement quantum annealing,
sampling from the domains of the at least one polynomial in binary variables using the binary sampling device to generate binary sample points,
receiving the generated binary sample points in the digital computer and transiting to next state of the stochastic search process; and
providing a best known solution found as a solution of the optimization problem using the digital computer.

2. The method as claimed in claim 1, wherein the optimization problem comprises an objective function with equality and inequality constraints.

3. The method as claimed in claim 1, wherein the optimization problem is obtained in the digital computer from at least one of a user, a computer, a software package and an agent.

4. The method as claimed in claim 1, wherein the initiating of a stochastic search process in the digital computer comprises:
setting up the stochastic search process;
setting up usage of the binary sampling device;
initializing temperature; and
initializing a state of the stochastic search process.

5. The method as claimed in claim 1, wherein the providing of a best known solution found as a solution of the optimization problem comprises providing the best state found to a user interacting the digital computer.

6. The method as claimed in claim 1, wherein the providing of a best known solution found as a solution of the optimization problem comprises providing the best known solution found to another computer operatively connected to the digital computer.

7. A digital computer comprising:
a central processing unit;
a display device;
a communication port for operatively connecting the digital computer to a binary sampling device, wherein the binary sampling device is configured to simulate or implement quantum annealing;
a memory unit comprising an application for continuous optimization using a stochastic search process, the application comprising:
instructions for obtaining an optimization problem involving a plurality of discrete variables and at least one continuous or semi-continuous variables;
instructions for initiating a stochastic search process respecting a neighborhood structure of the plurality of discrete variables in order to solve the optimization problem;
instructions for, until a stopping criterion is met:
constructing at least one stochastically generated polynomial in binary variables representative of choices of candidate future state of the stochastic search process using an affine transformation of domains of the at least one polynomial,
providing the at least one stochastically generated polynomial in binary variables to the binary sampling device via the communication port,
receiving generated binary sample points obtained by sampling from the domains of the at least one stochastically generated polynomial in binary variables using the binary sampling device and transiting to next state of the stochastic search process; and
instructions for providing a best known solution found as a solution of the optimization problem.

8. A non-transitory computer-readable storage medium for storing computer-executable instructions which, when executed, cause a digital computer to perform a method for continuous optimization using a stochastic search process, the method comprising:
obtaining an optimization problem involving a plurality of discrete variables and at least one continuous or semi-continuous variables;
initiating a stochastic search process respecting a neighborhood structure of the plurality of discrete variables in order to solve the optimization problem;
until a stopping criterion is met:
constructing at least one stochastically generated polynomial in binary variables representative of choices of candidate future state of the stochastic search process using an affine transformation of domains of the at least one polynomial,
providing the at least one stochastically generated polynomial in binary variables to a binary sampling device, wherein the binary sampling device is configured to simulate or implement quantum annealing, and
receiving generated binary sample points obtained by sampling from the domains of the at least one stochastically generated polynomial in binary variables using the binary sampling device and transiting to next state of the stochastic search process; and
providing a best known solution found as a solution of the optimization problem.

9. A method for continuous optimization using a stochastic search process, the method comprising:
obtaining, in a digital computer, an optimization problem involving a plurality of discrete variables and at least one continuous or semi-continuous variables;
initiating a stochastic search process in the digital computer in order to solve the optimization problem, wherein the stochastic search process respects a neighborhood structure of the plurality of discrete variables;
until a stopping criterion is met:
constructing in the digital computer at least one stochastically generated polynomial in binary variables representative of choices of candidate future state of the stochastic search process using an affine transformation of domains of the at least one polynomial,
providing the at least one stochastically generated polynomial in binary variables to a binary sampling device, wherein the binary sampling device is configured to simulate or implement quantum annealing,
receiving, in the digital computer, generated binary sample points obtained by sampling from the domains of the at least one stochastically generated polynomial in binary variables using the binary sampling device, and
transiting to next state of the stochastic search process; and
providing a best known solution found as a solution of the optimization problem using the digital computer.

* * * * *